(12) United States Patent
Fodor et al.

(10) Patent No.: US 6,562,238 B1
(45) Date of Patent: May 13, 2003

(54) METHOD AND APPARATUS FOR CONTROLLING COUNTER CURRENT

(75) Inventors: Jeffrey S. Fodor, Bartlesville, OK (US); Fernando C. Vidaurri, Jr., Bartlesville, OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

(21) Appl. No.: 09/222,169

(22) Filed: Dec. 29, 1998

(51) Int. Cl.$^7$ ................................................ B01D 11/02
(52) U.S. Cl. ........................ 210/633; 210/634; 210/739; 210/806; 525/537; 528/388
(58) Field of Search ...................... 210/87, 96.1, 97, 210/143, 145, 511, 634, 638, 644, 739, 746, 633; 422/62, 111, 256; 436/55, 142; 364/528.04, 528.08; 525/537; 528/388

(56) References Cited

U.S. PATENT DOCUMENTS

| | | | |
|---|---|---|---|
| 3,354,129 A | * 11/1967 | Edmonds et al. | |
| 3,394,189 A | * 7/1968 | West et al. | 210/634 |
| 3,782,624 A | * 1/1974 | Mueller | 210/145 |
| 4,393,197 A | * 7/1983 | Edmonds | 528/388 |
| 4,628,034 A | 12/1986 | Hofferber | 436/55 |
| 4,676,870 A | 6/1987 | Stewart et al. | 159/17.1 |
| 4,698,159 A | * 10/1987 | Brenner | 210/634 |
| 4,732,651 A | 3/1988 | Lisnyansky et al. | 162/49 |
| 4,882,418 A | * 11/1989 | Senatore et al. | 528/388 |
| 5,209,855 A | 5/1993 | Solaas | 210/743 |
| 5,707,525 A | * 1/1998 | Rogers et al. | 210/634 |
| 5,840,830 A | * 11/1998 | Miyahara et al. | 528/388 |
| 5,898,061 A | * 4/1999 | Sase et al. | 528/388 |
| 5,945,490 A | * 8/1999 | Tsuda et al. | 525/537 |
| 5,948,263 A | * 9/1999 | Chaiko et al. | 210/634 |

\* cited by examiner

*Primary Examiner*—Joseph W. Drodge

(57) ABSTRACT

In a multistage counter current wash operation wherein an original solvent contained in a cake of polymeric material is displaced with a wash solvent which enters the final stage and progresses forwardly a mathematical model of the counter current wash operation is developed for providing a feedforward control system. In use, the feedforward control system maintains a desired weight fraction of the original solvent that remains in the cake exiting the final wash stage at a desired low level by manipulating the wash solvent flow rate as a function of the flow rate of the feed material. Additionally a feedback control is used in conjunction with the feedforward control.

9 Claims, 5 Drawing Sheets

METHOD AND APPARATUS FOR CONTROLLING COUNTER CURRENT

The present invention relates to production of polymer resin, and more particularly to a method and an apparatus for controlling a multistage counter current wash train used for the recovery of polymer in a polymerization process.

BACKGROUND OF THE INVENTION

The production of arylene sulfide polymers by the reaction of at least one polyhalo-substituted cyclic compound with an alkali metal sulfide in a reaction medium comprising a polar organic compound is disclosed in U.S. Pat. No. 3,354,129, issued to Edmonds and Hill. The disclosure of this Edmonds and Hill patent is hereby incorporated by reference.

The poly(arylene) sulfide, hereinafter referred to as PAS, of most industrial importance is a semi-crystalline polyphenylene) sulfide polymer, herein after referred to as PPS, which is produced commercially in a reaction of a sodium sulfide equivalent, e.g., an approximately equal mixture of sodium hydrosulfide (NaSH) and sodium hydroxide (NaOH) followed by the addition of p-dichlorobenzene (DCB) in a reaction medium of a cyclic amide, such as N-methyl-2-pyrrolidone (NMP).

The presently preferred method for recovery of the PPS reaction product involves use of several counter current wash trains. The PPS process stream entering a counter-current washing operation is a solids cake saturated with an original solvent. As used herein, a cake is a discrete mass of solid polymer particles. The main objectives of a washing operation are to displace the original solvent that is wetting the solids cake with the wash solvent, and wash away dissolvable solids that might be contained in the cake. With an extreme amount of washing, e.g., many wash stages with very large wash solvent flow rates, essentially none of the original liquid solvent will remain on the cake exiting the final wash stage, i.e., the liquid on the exiting cake would be entirely the wash solvent. An economically desired degree of washing, however, does not displace all of the original liquid solvent with the wash liquid solvent. Accordingly, a small percentage of the original liquid solvent will remain on the solids cake exiting the wash train.

An installed counter-current wash train has a fixed number of stages, which will generally vary from two to six. In operation of a wash train in a PPS process, it would be highly desirable to maintain the fraction of original liquid solvent which enters with the cake and which remains on the cake exiting the final stage of the wash train, at a desired low level.

Accordingly, it is an object of this invention to control the portion of liquid solvent in the cake exiting the final stage of a multistage wash train that is the solvent entering with the cake.

It is a more specific object of this invention to compensate for uncontrolled feed disturbances entering the wash train using feedforward control techniques.

Another object is to utilize feedforward control techniques in conjunction with feedback techniques for precise control, and to rapidly handle unknown contingencies that might otherwise disturb a pure feedforward control system.

Another object of this invention is to reduce the oligomer content in the PPS product.

Yet another object is to improve efficiency in use of wash liquids.

Still another object of this invention is to develop a material balance relationship for a wash train to give results that are readily incorporated into spreadsheet type software.

Yet another objective is to recover valuable reaction additives which are soluble in a specific wash solvent.

These and other objects and aspects, as well as the advantages of this invention will be apparent to those skilled in the art upon reading the specification and the appended claims.

SUMMARY OF THE INVENTION

According to the present invention, the foregoing and other objects and advantages are attained with a steady state feedforward control system for a counter current wash operation in a polymerization process. In the counter current wash operation a polymerization reaction product, which is a solids cake saturated with an original solvent, is passed through a series of wash stages. A wash solvent is introduced to contact the cake in a counter current manner, so as to displace essentially all of the original solvent and dissolve and wash dissoluable solids before the cake exits the final wash stage. In accordance with this invention, a steady state model for feedforward control of the wash operation is developed based on a material balance, and this relationship incorporates the process load variable, the manipulated variable and the controlled variable. The feedforward control method further requires the steps of measuring the process load variable, and computing a set point for the manipulated variable as a function of the process load variable.

In a preferred embodiment of the control system, the manipulated variable is the wash solvent flow rate, which is manipulated as a function of the process load so as to maintain the weight fraction of the original solvent remaining on the cake exiting the final wash stage at a desired low level. The feedforward control scheme is enhanced by adding a feedback trimming signal. The feedback scheme comprises determining the weight fraction of the original solvent remaining on the cake exiting the final wash stage, comparing the thus determined flow to a set point, and trimming the manipulated variable set point calculated by the feedforward control system, responsive to the difference between the determined feedback variable and its set point.

The method and apparatus of this invention using a combination of feedforward and feedback control of the counter current wash operation, which handles a solvent wet mass of polymer resin, maintains the mass fraction of original solvent remaining on the exiting polymer cake at a desired low level. Further, according to this control scheme, disturbances in the process load, which can change rapidly and frequently, are detected at the input of the initial wash stage and promptly compensated by a corresponding disturbance in the manipulated variable, which will counteract the effect of the initial disturbance.

Other objects and advantages of the invention will be apparent from the foregoing brief description of the invention and from the claims as well as from the detailed description of the drawings, which are briefly described as follows:

DETAILED DESCRIPTION OF THE PREFERRED EMBODIMENT

The invention is illustrated in terms of a three stage counter current washing system used in the production of PPS polymer resin. The invention, however, is applicable to any number of solid/liquid separation stages where it is desired to control the amount of liquid solvent entering the wash train in a polymer cake, and that remains in the cake after passing through the wash train, since extension to more or fewer stages will not change the control system configuration. Further, wet solutions of solid particles other than PPS particles may be utilized as feed material. The separation stages may be membranes, filters, screens, centrifuges or other apparatuses used to separate solids from liquids.

When treating a PPS resin in accordance with this invention, the washing treatment may be carried out at an elevated temperature which does not exceed the melting point of the resin. Generally, a temperature between 70° and 100° F., and a pressure near atmospheric is preferred. Control of the wash train according to this invention is achieved by manipulating the flow rate of a washing solvent, which counter currently contacts a wet PPS cake as it is passed through the wash train. Simple feedback control of the counter current wash train has not been satisfactory, due for one reason to the delay encountered in the feed material passing through multiple wash stages.

Figure 1:
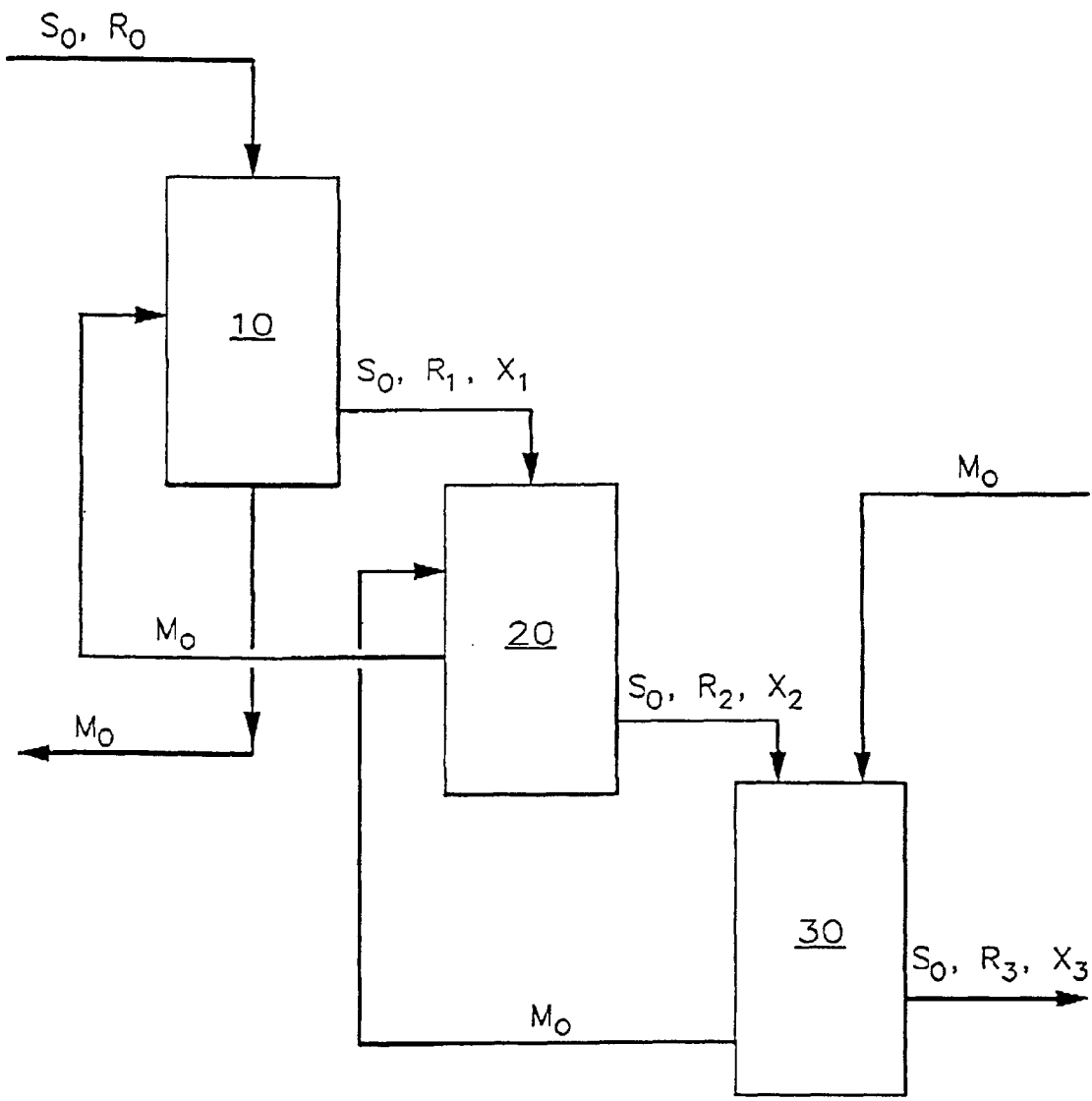
FIG. 1 is a simplified drawing illustrating a three-stage counter current wash train from the viewpoint of a material balance, and for a feed material without dissolvable solids.

Referring now to FIG. 1, there is schematically illustrated a counter current wash train utilizing three identical stages, shown at reference numerals 10, 20 and 30, which is useful from the standpoint of obtaining a material balance. Also required for the material balance is a relationship between the mass of nondissolavible solids in the entering cake, referred to in FIG. 1 as S, and the mass of liquid in the entering cake, referred to as R. This relationship, however, remains essentially constant for a given system.

Still referring to FIG. 1, in which:

S=mass rate of nondissolvable solids in the cake, lbs./hr. (constant).

R=mass rate of liquid in cake, lbs./hr. (assumed constant).

M=mass rate of wash liquid, lbs/hr.

$x_{(1)}$, $x_{(2)}$, $x_{(3)}$=weight fraction of original solvent remaining on exiting cake.

The solids/liquid separation in each stage is assumed to occur with no solids exiting in the filtrate stream, and the cake solids concentration is assumed to be constant after each solids/liquid separation. With the assumption that mixing occurs instantaneously (i.e., non-difusionally hindered), the composition of the liquid is determined independently of the solids concentration and mixing time. The fraction of original solvent remaining in the cake exiting each stage can be found by an overall material balance to be:

$$\text{Stage 1} \quad x_{(1)} = \frac{R + x_{(2)} \cdot M}{R + M} \quad \text{EQ. (1)}$$

$$\text{Stage 2} \quad x_{(2)} = \frac{x_{(1)} \cdot R + X_{(3)} \cdot M}{R + M} \quad \text{EQ. (2)}$$

$$\text{Stage 3} \quad x_{(3)} = \frac{x_{(2)} \cdot M}{R + M} \quad \text{EQ. (3)}$$

Since the desired result is the composition in the last stage of an N-stage wash train, i.e., amount of original solvent remaining with the cake exiting the final stage of the counter current wash train, direct expressions for $x_{(N)}$ can be obtained from equations (1)–(3) above. The resulting expressions are as follows:

$$N = 1 \quad x_{(1)} = \frac{R}{R + M} \quad \text{EQ. (4)}$$

$$N = 2 \quad x_{(2)} = \frac{R^2}{R^2 + M \cdot R + M^2} \quad \text{EQ. (5)}$$

$$N = 3 \quad x_{(3)} = \frac{R^3}{R^3 + M \cdot R^2 + M^2 \cdot R + M^3} \quad \text{EQ. (6)}$$

$$N = 4 \quad x_{(4)} = \frac{R^4}{R^4 + M \cdot R^3 + M^2 \cdot R^2 + M^3 \cdot R + M^4} \quad \text{EQ. (7)}$$

$$N = 5 \quad x_{(5)} = \frac{R^5}{R^5 + M \cdot R^4 + M^2 \cdot R^3 + M^3 \cdot R^2 + M^4 \cdot R + M^5} \quad \text{EQ. (8)}$$

Detecting a pattern in Equations (4) to (8), leads to a series representation given below:

$$x_{(N)} = \frac{1}{1 + \sum_{n=1}^{N} (M/R)^n} \quad \text{EQ. (9)}$$

Simplifying EQ. (9) leads to a compact expression for the fraction of original solvent remaining on the cake exiting the last stage of an N-stage counter current wash train.

$$x_{(n)} = \frac{M/R - 1}{(M/R)^{N+1} - 1} \text{ for } M/R \neq 1 \quad \text{EQ. (10)}$$

$$x_{(N)} = \frac{1}{N + 1} \text{ for } M/R = 1 \quad \text{EQ. (11)}$$

Equation 10 results from simplification of the summation in eq. (9). The solution of $x_{(N)}$ in eq. (10) at (M/R)=1 is indeterminate, however, a solution can be found by taking the limit as (M/R) approaches unity. This result is given in EQ. (11).

Accordingly, the flow rates of all streams exiting an N-stage counter current wash train can be determined from knowledge of the mass flow rate of nondissolvable solids, S, entering the train, the mass flow rate of liquid, R, entering with the solids, the wash liquid flow rate M, and the weight fraction of original solvent that exits with the cake solids, $x_{(N)}$. (i.e. R can be determined from knowledge of the wt. % solids on a saturated cake, and the solids flow rate through the train.) The value of $x_{(N)}$ can be determined from N, M and R using equations (10) and (11), i.e., the composition of the fraction $x_{(N)}$ of exiting cake liquid is identical to the composition of the entering liquid solvent, and the remaining fraction of the cake liquid (1-$x_{(N)}$) is the same composition as the wash liquid solvent. Equations (10) and (11) are the steady state model of the process, where the wash process is characterized by the absence of dissolvable solids in the feed material, and the previously stated assumptions. These equations define the relationship of the necessary model variables, which include the load variables S and R, the manipulated variable M, and the controlled variable $x_{(N)}$.

In recently designed PPS polymerization processes, however, each of the washing steps involves solids cakes in which a portion of the cake contains a dissolvable solid material. Accordingly, in addition to solvent displacement, a key reason for many of the washing steps in the polymerization process is to remove the undesired dissolvable solids from the cake.

Figure 2:
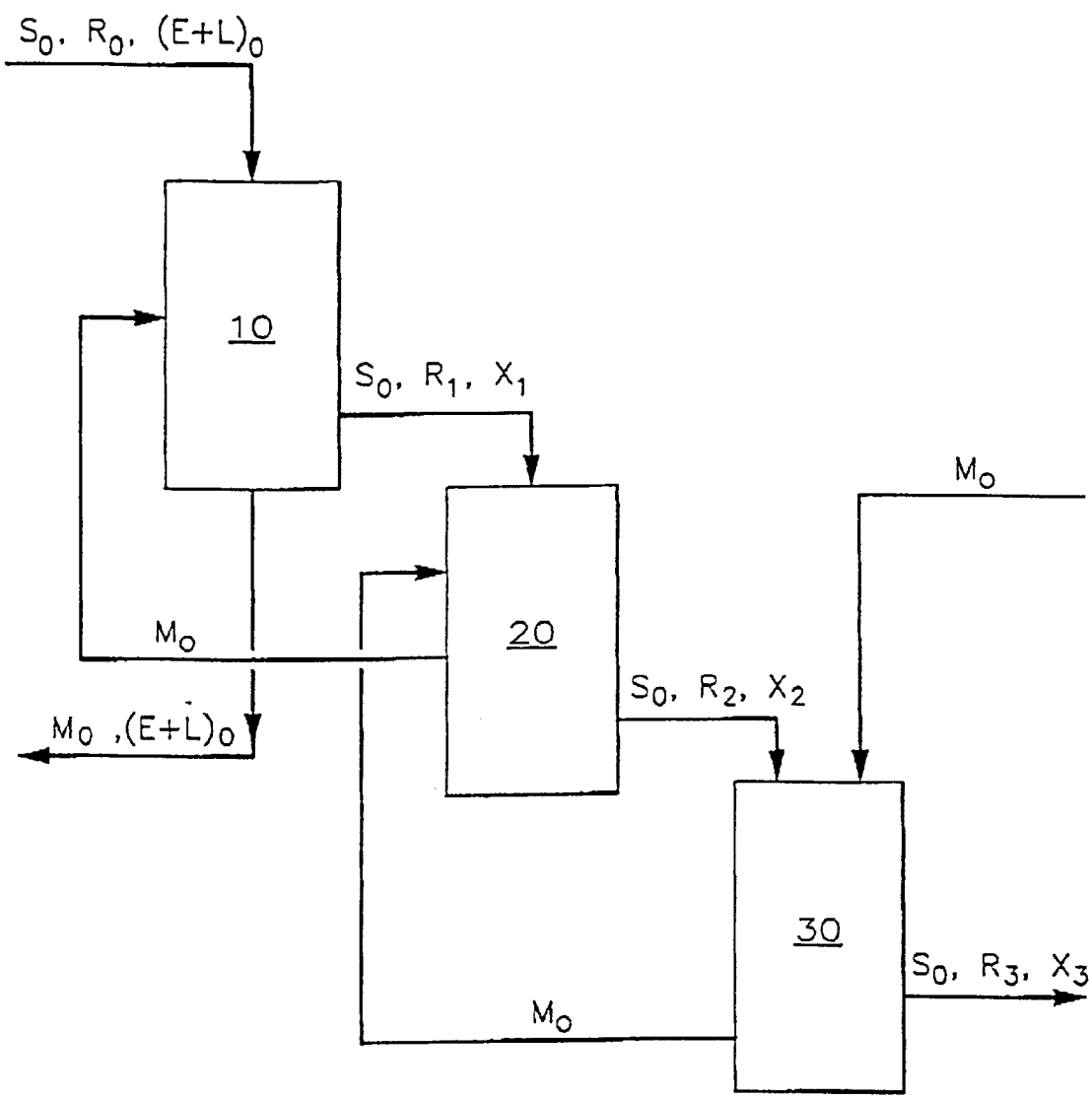
FIG. 2 is a drawing similar to FIG. 1 illustrating a feed material including dissolvable solids.

FIG. 2 is a diagram similar to FIG. 1, which illustrates a three-stage counter current wash train with dissolvable solids included with the entering cake. In FIG. 2 symbols identical to FIG. 1 are used, with two additional symbols defined as follows:

E=mass rate equal to mass of dissolvable solids, lbs./hr.
L=mass rate of liquid on "E" portion of entering cake, lbs./hr.

Using the same material balance analysis and assumptions as the case without dissolvable solids, but with additional mass flow of (E+L) as shown in FIG. 2, simplified equations corresponding the equations (10) and (11) for model equations for the process characterized by the presence of saturated dissolvable solids in the entering cake, are developed as follows:

$$x_{(N)} = \frac{1}{\frac{R}{R+E+L} \cdot (M/R)^n + R/M \cdot \frac{(M/R)^{N+1}}{(M/R)-1} - \frac{1}{((M/R)-1)}} \quad \text{for } M/R \neq 1 \quad \text{EQ. (13)}$$

and $$x_{(N)} = \frac{1}{\frac{R}{R+E+L} + N + 1} \quad \text{for } M/R = 1 \quad \text{EQ. (14)}$$

Accordingly, equations (13) and (14) are the steady state model equations for the washing process, where the process is characterized by the presence of dissolvable solids in the feed material.

Figure 3:
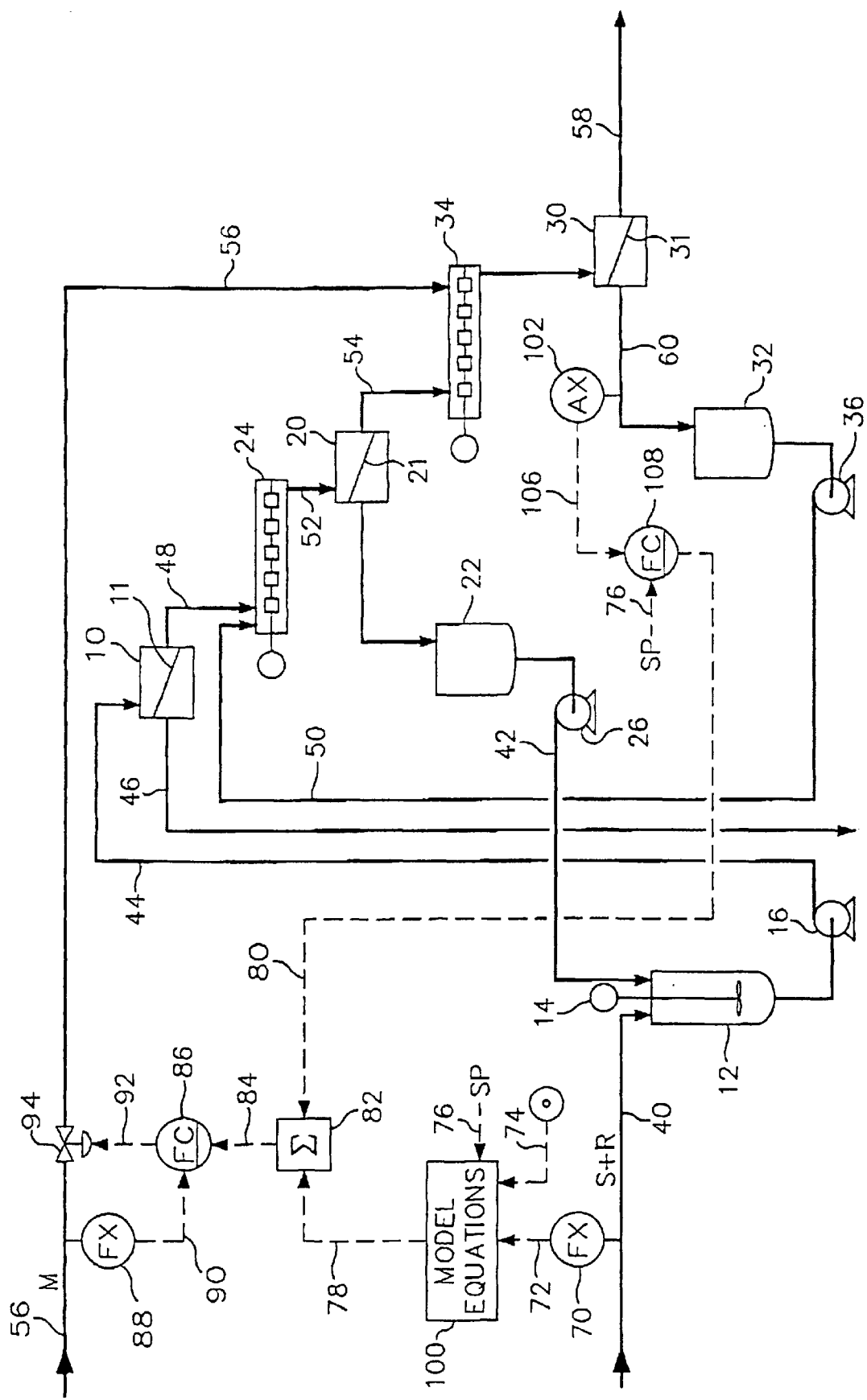
FIG. 3 is a simplified schematic illustration of a three-stage counter current wash train and the associated feedforward control scheme trimmed by a feedback signal according to this invention.

Referring now to FIG. 3, there is illustrated an arrangement for a three-stage polymer wash train, including a first stage separator 10, a second stage separator 20 and a final stage separator 30, with each separator stage having an associated screen to effect the separation of the free liquid solvent from the saturated cake. The screens for the first, second and final stages are shown at reference numerals 11, 21, and 31 respectively. The apparatus further includes a first, a second and a third slurry tank illustrated at reference numerals 12, 22 and 32 respectively, with each slurry tank having an associated mixer or stirrer, which are illustrated at reference numerals 14, 24 and 34 respectively. Also illustrated in FIG. 3 are pumps 16, 26 and 36, which are required for circulating the slurry tank effluent.

In a counter current washing arrangement, as illustrated in FIG. 3, the amount of original solvent, that is to be essentially displaced, but with a small portion remaining in the exiting cake, is influenced by the cake solids content, the number of separation stages that reslurry and screen the cake, and the amount of wash solvent used in the counter current process. And each of these parameters has a significant impact on the economics of the overall polymerization process. Non-idealities during washing arise when diffusion of the original solvent from the cake to the wash solvent is slow.

Still referring to FIG. 3, a saturated feedcake (S+R) enters the first stage slurry tank 12 via a conduit 40 where it is mixed with a filtrate stream entering through conduit 42 using stirrer 14. The resulting slurry in tank 12 is passed via conduit 44 to a first separation stage, which is illustrated at reference character 10, where the slurry is screened using screen 11. The filtrate exiting stage 10 contains a mixture including the original solvent, small solid particles that can pass through the screen, the wash solvent, and if applicable dissolvable solids displaced from the entering cake. This mixture exits the overall boundary of the wash train in a stream flowing in conduit 46. The saturated cake exiting separation stage 10 via conduit 48 is re-slurried in mixer/slurry tank 24 with a filtrate stream entering via conduit 50, and the mixture is passed to the second separation stage 20 via conduit 52. In a manner similar to the first stage separation in stage 10, the reslurried material entering the second stage separator 20 is screened using screen 21 to separate free liquid from the saturated cake. The filtrate from the second stage surge tank 22 is passed to the first stage slurry tank 12 via conduit 42. The cake exiting the second separation stage 20 is passed to mixer/slurry tank 34 via conduit 54, where it is reslurried with fresh wash liquid M entering the mixer 34 via conduit 56. Screening in the wash stage 30 yields the final wash cake, which is withdrawn through conduit 58. The filtrate from separation stage 30 is withdrawn via conduit 60 and passed to surge tank 32. The effluent of surge tank 32 is passed via conduit 50 to mixer/slurry tank 24 to reslurry the cake exiting the first separation stage 1. Accordingly, two streams enter the overall continuous train in conduits 40 and 56, and two streams exit the overall train in conduits 46 and 58. With this arrangement very efficient solids washing is achieved with minimal fresh wash solvent usage. Screening was stated as the solid-liquid separation, however, any effective solid-liquid separation device could be used, such as centrifuges, hydrocyclones, filter presses, etc.

A specific control system configuration for a counter current wash train is set forth in FIG. 3 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form, it must be transduced to electrical form by a flow transmitter. The invention is also applicable to mechanical, hydraulic or other signal means for transmitting information. In almost all control systems, some combination of electrical, pneumatic, mechanical or hydraulic signals will be used. However, any other type of signal transmission, compatible with the processing equipment, is within the scope of the invention.

A digital computer, which is provided with a mathematical model of the wash train process, is used in this invention to calculate the required control signals, based on measured process flow variables, as well as set points supplied to the computer. A number of commercially available digital computer programs have been developed that can operate in a real time environment for reading in values of external variables and transmitting control signals to external devices. One such program, which is well known, is "Excel Visual Basic," which runs for example, on any IBM compatible machine with an 80386 processor or higher. This program is particularly effective for automation applications, and is the preferred program for use in this invention. Signal lines are also utilized to represent the results of calculations carried out in the digital computer and the term "signal" is used to refer to such results. Thus, the term signal is used not only to refer to electrical currents or pneumatic pressures, but it is also used to refer to digital representations of a calculated or measured value.

The flow controllers shown in FIG. 3 may be pneumatic, electronic, digital electronic, or distributed computer elements. Each of the controllers, however, may utilize the various conventional modes of control, such as proportional-integral, or proportional-integral-derivative (PID). In this preferred embodiment, proportional-integral (PI) controllers are used.

The scaling of an output signal in a PID controller is well known in the control systems art. Essentially the output of a PID controller may be scaled to represent any desired factor or variable. An example of this is where a desired flow rate and an actual flow rate are compared by a controller. The controller output can be a signal representative of a desired change in the flow rate of some gas necessary to make the desired and actual flow equal. On the other hand, the same output signal could be scaled to represent a percentage or could be scaled to represent a temperature change required to make the desired and actual flows equal.

The various transducing means to measure parameters which characterize the process and the various signals generated thereby, may take a variety of forms or formats. While the presently preferred embodiment of this invention utilizes a combination of pneumatic final control elements in conjunction with electrical analog or digital electronic signal handling and translation apparatus, the apparatus and method of the invention can be implemented using a variety of specific equipment available and understood by those skilled in the process control art. Likewise, the format of the various signals can be modified substantially in order to accommodate signal format requirements of the particular installation, safety factor, the physical characteristics of the measuring or control instrument, and other similar factors. For example, a measurement signal produced by a differential orifice flow meter would ordinarily exhibit a generally proportional relationship the square of the actual flow rate. Other measuring instruments might produce a signal which is directly proportional to the measured parameter, and still other transducers may produce a signal which bears a more complicated, but known, relationship to the measured parameter. Regardless of the signal format or the exact relationship of the signal to the parameter which it represents, each signal representative of a measured process parameter, or representative of a desired process value will bear a relationship to the measured parameter or desired value which permits designation of a specific measured value by a specific signal value, or desired value by a specific signal value. A signal which is representative of a process measurement or a desired process value is, therefore, one from which the information regarding the measurement or desired value can be readily retrieved, regardless of the exact mathematical relationship between the signal units and the measured or desired process units.

Several post reaction process steps for the recovery of PPS are well known. In a presently preferred recovery method several counter current wash trains may be employed. For example, a saturated feedcake exiting the reactor is introduced to a first wash train where hot NMP wash solvent is used to substantially enhance oligomer reduction in the saturated feedcake. Screening operations are next performed where the oligomers are removed with the filtrate and significant portions of the salts are separated from the PPS. A saturated high solids PPS stream exiting the hot NMP wash train is then subjected to a second counter-current wash using methanol as the displacement liquid to remove remaining NaOAc salt and displace NMP. The cake exiting this wash is subjected to a third counter-current wash using water to rinse away any remaining NaCl and displace the methanol. The cake exiting the water wash contains PPS and water, and can be dried to yield the final resin product.

Referring again now to FIG. 3 to describe in more detail the specific control system for a counter current wash train, a flow transducer 70 in combination with a mass flow sensor operably located in conduit 40 provides an output signal 72 which is representative of the actual total mass flow rate of the saturated cake flowing in conduit 40. Signal 72 is provided as a first input signal to a digital computer, which is identified as an equation processor 100 in FIG. 3. A second signal, which is a set point signal representative of the desired mass fraction of original solvent remaining on the exiting cake, is input to the computer 100 as illustrated at reference numeral 76. Also provided to computer 100 via a data input, illustrated at 74, are parameters that remain constant for a given system, including: the weight percent solids (a constant for a given system) contained in the saturated cake flowing in conduit 40; the number of wash stages in the train (a constant); and the mass flow rate of liquid solvent contained in the nondisolvable solids portion of the cake entering the wash train, lbs./hr. (assumed constant). Responsive to the above mentioned two signals and the additional input data, computer 100 calculates a set point signal 78, which is representative of the flow rate of fresh wash solvent required to maintain the desired mass fraction of original solvent remaining on the exiting cake in conduit 58, substantially equal to the desired value represented by set point signal 76. The calculation of signal 78, which involves an iterative solution of the model equations, will be more fully explained hereinbelow in connection with FIG. 4.

Signal 78 is summed with signal 80 in a summing device 82 to establish signal 84, which is provided as a set point signal to flow controller 86. A flow transducer 88 in combination with a flow measuring device operably located in conduit 56 provides an output signal 90, which is representative of the actual mass flow rate of the fresh wash solvent flowing in conduit 56. Signal 90 is provided as a second input to flow controller 86. Signals 90 and 84 are compared in flow controller 86 to establish an output signal 92, which is responsive to the difference between signals 84 and 90. Signal 90 is a control signal scaled to be representative of the position of control valve 94 required to maintain the desired mass fraction of original solvent remaining on said solids cake exiting the final stage substantially equal to the desired value represented by signal 76. Signal 92 is provided to control valve 94, and control valve 94 is manipulated in response to signal 92.

A composition analyzer 102 in combination with a mass flow sensor operably located in conduit 60 (not illustrated) provides an output signal 106. Signal 106 is a signal representative of the actual mass fraction of original solvent remaining on the exiting cake. Signal 106 is provided as a first input to controller 108. Controller 108 is also provided with a second signal, which is a set point signal 76 representative of the desired weight fraction of original solvent remaining on the exiting cake. Signals 106 and 76 are compared in controller 108 for establishing an output signal 80, which is responsive to the difference between signals 106 and 76. Signal 80, like signal 78, is a control signal scaled to be representative of the mass flow rate of fresh wash solvent required to maintain the desired mass fraction of original solvent remaining on an exiting cake substantially equal to the desired value represented by set point signal 76. As previously mentioned signal 80 is combined with signal 78 in summation block 82, and thus provides a feedback trim for signal 78.

Figure 4:
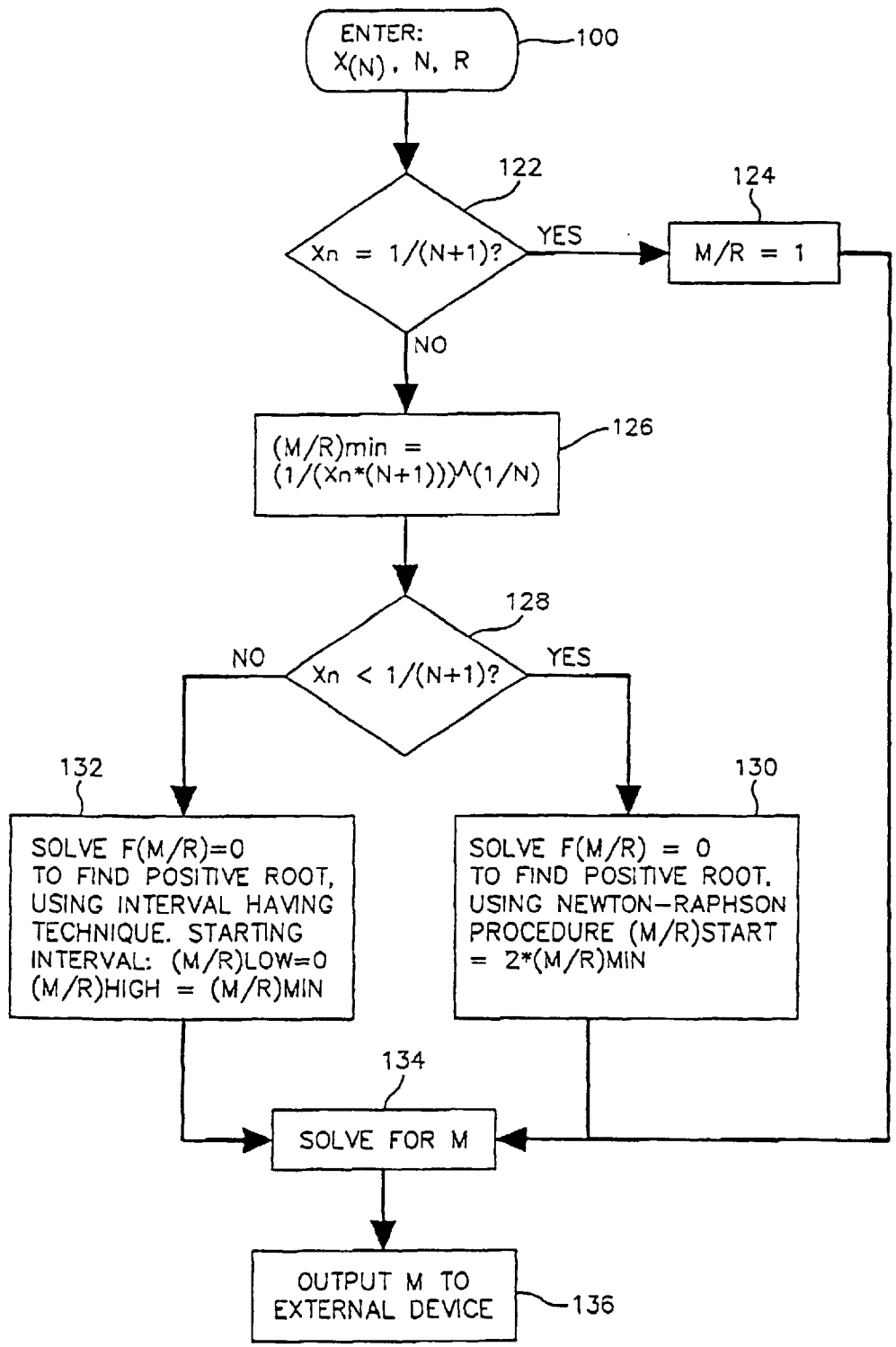
FIG. 4 is a computer software flow chart for finding the roots of the steady state model equation using an interval halving technique, or the Newton-Raphson procedure for iteratively solving the steady state model equation for the case of the feed material without dissolvable solids.

As a first embodiment of the counter current control apparatus, the computer 100 is programmed to calculate the mass flow rate of fresh wash solvent required to maintain the desired amount of original solvent on the exiting cake. This sequence is illustrated in FIG. 4 for the case where in feed cake does not contain solids dissolvable in the solvent, and the symbols M, R, N and $x_{(N)}$ are as previously defined. Parameters entered into the computer include $x_{(N)}$, N, and R as indicated in block 120. The program discriminates at step 122 as to the equivalence of $x_{(N)}$ being equal to 1/(N+1). When the result is yes, M/R is set equal to unity as indicated in block 124. When the result is negative M/R(min) is defined as $(1/(x_{(N)}(N-1)))/(1/N)$ as shown in block 126. In the next step illustrated at 128, the program discriminates as to the value of $x_{(N)}$ being greater or less than 1/(N+1). When the result is less, the model equation (10) is solved for M/R using a Newton-Raphson procedure with a starting value of M/R equal to 2(M/R)min., as illustrated in step 130. See Perry's Chemical Engineers' Handbook, Chapter 2 for details concerning the Newton-Raphson procedure. When the result of the discrimination in step 128 is greater, the model equation (10) is solved for M/R using an interval halving technique between end points of M/R equal 0, and M/R equal (M/R)min, as illustrated in step 132. The program then proceeds to step 134 to solve for M, and then to output the value of M to an external device as shown in step 136.

Figure 5:
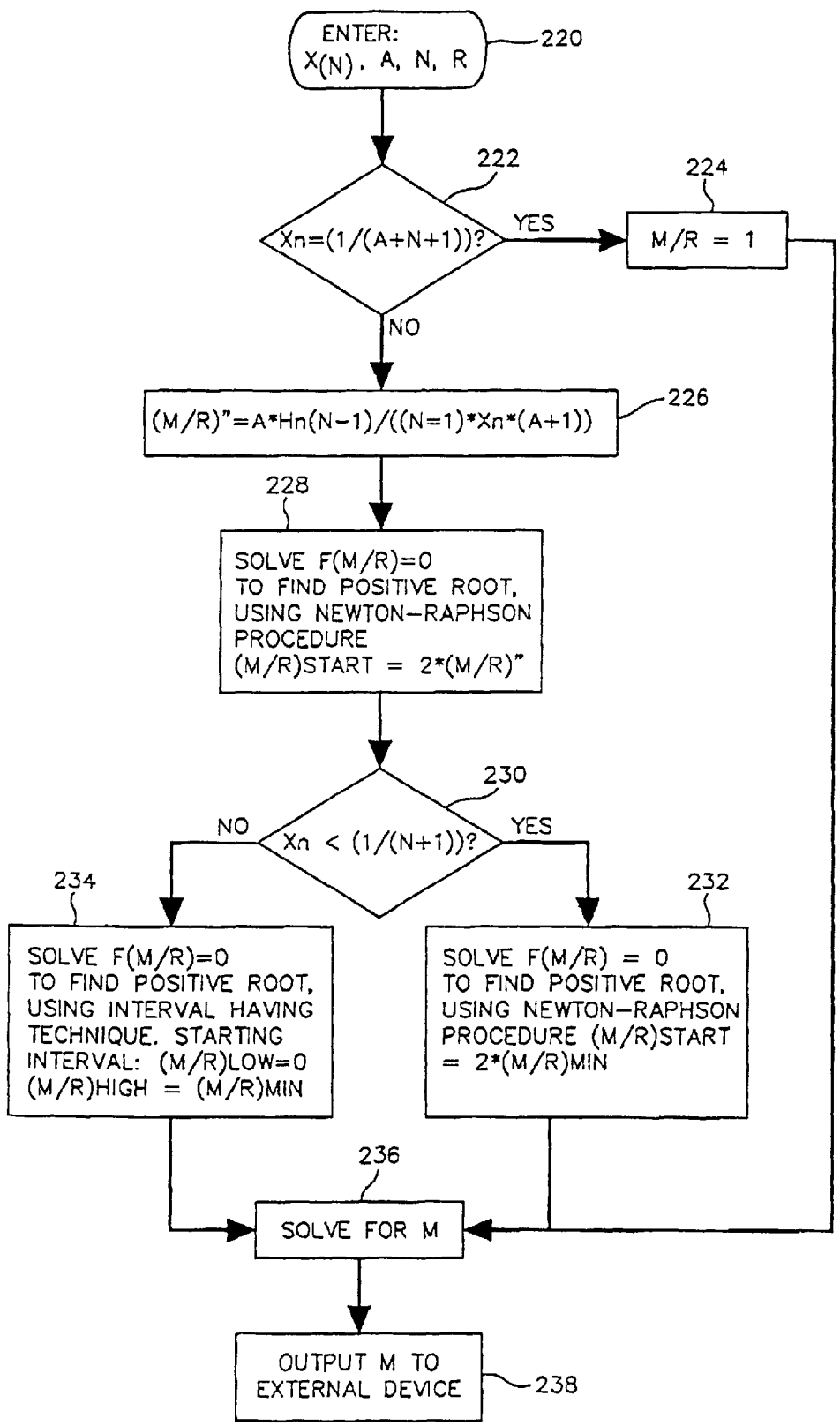
FIG. 5 is a diagram similar to FIG. 4 for the case of the feed material containing dissolvable solids.

As a second embodiment of the counter current control apparatus, the computer 100 is programmed to calculate the mass flow rate of fresh wash solvent required to maintain the desired amount of original solvent on the exiting cake. This sequence, which is similar to the first embodiment, is illustrated in FIG. 5 for the case where the feed cake contains solids dissolvable in the solvent. Additional parameters compared to FIG. 4 include E and L, which have been previously defined, and A which is defined as A=R/(R+E+L). Parameters entered into the computer 100 include: $x_{(N)}$, R, N, A as indicated in block 120. The program discriminates at step 222 as to the equivalence of $x_{(N)}$ being equal to 1/(A+N+1). When the answer is yes, M/R is set equal to unity as indicated in block 224. When the answer is negative, a starting value for M/R is defined as $M/R'=A^*x_{(N)}(N-1)/((N+1)^*x_{(N)}^*(A+1))$ as shown in step 226. In the next step illustrated at 228, the program solves for M/R(min) using the Newton-Raphson procedure with a starting point equal to 2*M/R'. The program discriminates at step 230 as to the equivalence of $x_{(N)}$ being greater or less than 1/(A+N+1). When the result is less, the model equation (13) is solved for M/R using a Newton-Raphson procedure with a starting value of 2*M/R(min) as illustrated in step 232. When the result of the discrimination in step 230 is greater, the model equation (13) is solved for M/R using an interval halving technique between end points of zero and M/R=M/R(min) as illustrated in step 234. The program then proceeds to step 236 to solve for M, and then to step 238 to output the value of M to an external device.

Specific control components used in the practice of this invention, as illustrated in FIG. 3, such as flow transducers, flow sensors, PID controllers, pumps, and computing devices, are each well known commercially available control components such as are described in Perry's Chemical Engineers Handbook, 6th Edition, Chapter 22, McGraw-Hill.

In summary, the control system for the counter current wash train of the present invention, which maintains a desired mass fraction of original solvent on the exiting cake, aids in producing cleaner resins, controlling the oligomer content of the resin as well as reducing waste disposal costs, and wash solvent recovery costs.

While the invention has been described in terms of the presently preferred embodiment, reasonable variations and modifications are possible by those skilled in the art and such variations and modifications are within the scope of the described invention.

That which is claimed is:

1. A feedforward method for controlling a counter current wash operation, wherein a reaction product comprising a solids cake that is essentially saturated with a first solvent is passed through a plurality of wash stages in said wash operation, and wherein essentially all of said first solvent is displaced from said cake with a second solvent which is introduced to counter currently contact said cake in said wash operation, said method comprising:

(a) providing an on-line equation processor for reading in values of variables and transmitting control signals, said processor having a steady state mathematical model for said wash operation stored in a memory, and wherein said model involves a process load variable, a controlled variable and a manipulated variable;

(b) establishing a first signal which provides a measurement of said process load, and wherein said first signal is representative of the mass flow rate of saturated cake entering said wash train;

(c) establishing a second signal which is a desired value of said controlled variable, and wherein said second signal is representative of the desired mass fraction of said first solvent remaining on said solids cake exiting a final stage in said wash operation; and (d) using said mathematical model and said first signal and said second signal for establishing a third signal which is a set point signal representative of the flow rate of said second solvent required to maintain the mass fraction of said first solvent remaining on said solids cake exiting said final stage substantially equal to the desired value represented by said second signal.

2. A method in accordance with claim 1, additionally comprising:

establishing a fourth signal which provides an actual measurement of said manipulated variable, and wherein said fourth signal is representative of the mass flow rate of said second solvent;

comparing said third signal and said fourth signal for establishing a fifth signal, which is a scaled control signal responsive to the difference between said third signal and said fourth signal; and manipulating the flow rate of said second solvent responsive to said fifth signal.

3. A method in accordance with claim 1, additionally comprising the following steps for providing a feedback control signal in conjunction with said feedforward control:

establishing a sixth signal which is representative of the weight fraction of said first solvent remaining on said cake exiting said final stage of said counter current wash train;

comparing said sixth signal and said second signal to establish a seventh signal, which is a scaled control signal responsive to the difference between said sixth signal and said second signal, and wherein said seventh signal is scaled to be representative of the change in flow rate of said second solvent required to maintain the desired mass fraction of said first solvent remaining on said solids cake exiting said final stage represented by said second signal substantially equal to the mass fraction represented by said sixth signal; and combining said seventh signal and said third signal, wherein said seventh signal comprises said feedback control signal.

4. A method in accordance with claim 3, wherein said step of establishing said sixth signal comprises:

establishing an eighth signal which provides a mass flow measurement of filtrate withdrawn from a surge tank associated with said final stage in said wash train;

establishing a ninth signal which provides a concentration measurement of said first solvent withdrawn from said surge tank; and using said eighth signal and said ninth signal for computing a tenth signal which is representative of the mass fraction of said first solvent remaining on said cake exiting said final stage of said wash train.

5. A method in accordance with claim 1, wherein said plurality of wash stages includes a range of wash stages ranging from two stages to twenty stages.

6. A method in accordance with claim 1, wherein said second solvent is selected from the group of solvents consisting of: NMP (N-methyl-2-pyrrolidone), methanol, and water.

7. A method in accordance with claim 1, wherein said model comprises equation of the form:

$$x_{(N)} = \frac{1}{\frac{R}{R+E+L} \cdot (M/R)^n + R/M \cdot \frac{(M/R)^{N+1}}{(M/R)-1} - \frac{1}{((M/R)-1)}} \quad \text{for } M/R \neq 1 \quad \text{EQ. (13)}$$

and $$x_{(N)} = \frac{1}{\frac{R}{R+E+L} + N + 1} \quad \text{for } M/R = 1 \quad \text{EQ. (14)}$$

where:

N=number of stages in counter current wash train;

M=mass flow rate of the second solvent, lbs./hr.

R=mass flow rate of liquid solvent contained in cake, lbs./hr.

E=mass flow rate of dissolvable solids in cake, lbs./hr

L=mass flow rate of liquid solvent contained in dissolvable solids, lbs./hr $x_{(N)}$=mass fraction of first solvent.

8. A method in accordance with claim 1, wherein said solids cake comprises a mass of poly(phenylene) sulfide polymer resin recovered from a polymerization reaction.

9. A method in accordance with claim 8, wherein said process load variable comprises the mass flow rate of said cake saturated with said first solvent, wherein said manipulated variable comprises the mass flow rate of said second solvent, and wherein said controlled variable comprises the mass fraction of said first solvent remaining on said cake exiting said final stage.

* * * * *